US012661983B2

(12) United States Patent
 Al Khatib et al.

(10) Patent No.: US 12,661,983 B2
(45) Date of Patent: Jun. 23, 2026

(54) SYSTEMS AND METHODS FOR ENHANCING VISIBILITY WHILE DRIVING A VEHICLE

(71) Applicant: Ford Global Technologies, LLC, Dearborn, MI (US)

(72) Inventors: Rami Al Khatib, Dearborn, MI (US); Mahmoud Yousef Ghannam, Canton, MI (US); Mansoor Nasir, Canton, MI (US); John Robert Van Wiemeersch, Novi, MI (US)

( * ) Notice: Subject to any disclaimer, the term of this patent is extended or adjusted under 35 U.S.C. 154(b) by 0 days.

(21) Appl. No.: 18/980,827

(22) Filed: Dec. 13, 2024

(65) Prior Publication Data

US 2026/0166995 A1     Jun. 18, 2026

(51) Int. Cl.

| | |
|---|---|
| *G08G 1/0962* | (2006.01) |
| *B60K 35/23* | (2024.01) |
| *B60K 35/28* | (2024.01) |
| *B60K 35/29* | (2024.01) |
| *B60Q 9/00* | (2006.01) |
| *G02B 27/01* | (2006.01) |

(52) U.S. Cl.
 CPC .............. *B60K 35/23* (2024.01); *B60K 35/28* (2024.01); *B60K 35/29* (2024.01); *G02B 27/01* (2013.01); *B60K 2360/176* (2024.01); *G02B 2027/0141* (2013.01)

(58) Field of Classification Search
 CPC ....................................................... B60R 11/04
 See application file for complete search history.

(56) References Cited

U.S. PATENT DOCUMENTS

| | | | | |
|---|---|---|---|---|
| 5,214,413 A | * | 5/1993 | Okabayashi | ............. G09G 3/02 |
| | | | | 345/7 |
| 9,047,745 B2 | * | 6/2015 | Terre | ...................... H04N 23/11 |
| 2004/0066376 A1 | * | 4/2004 | Donath | ................ G01C 21/365 |
| | | | | 345/169 |
| 2007/0291231 A1 | * | 12/2007 | Hammoud | ............. G06V 40/19 |
| | | | | 351/222 |

(Continued)

FOREIGN PATENT DOCUMENTS

| | | |
|---|---|---|
| CN | 108099790 B | 7/2021 |

OTHER PUBLICATIONS

Filip Malawski, Driver Assistance System Using Augmented Reality Headset, AGH University of Science and Technology Krakow, Poland, Jul. 4-6, 2018, pp. 250-253.

*Primary Examiner* — Nan-Ying Yang
(74) *Attorney, Agent, or Firm* — Frank Lollo; Eversheds Sutherland (US) LLP

(57) ABSTRACT

Systems and methods for enhancing visibility while driving a vehicle are provided. When driving under adverse weather conditions, the driver's visibility of the road may be reduced. The driver may use an augmented reality device to aid in the view of the roadway. The augmented reality device works in conjunction with the vehicle to determine the type of environmental/weather condition that is causing the reduced visibility. Based on that, the vehicle and/or the augmented reality device may determine additional information using one or more of its sensors to augment the image displayed by the augmented reality device. The augmented image includes more details of the road and the environment surrounding the vehicle, thus providing the driver with enhanced visibility of the road and the surrounding environment.

19 Claims, 7 Drawing Sheets

(56)                    References Cited

U.S. PATENT DOCUMENTS

| | | | |
|---|---|---|---|
| 2011/0227813 | A1 | 9/2011 | Haddick et al. |
| 2013/0194110 | A1* | 8/2013 | Kim ..................... G06V 40/165 |
| | | | 340/905 |
| 2017/0076599 | A1* | 3/2017 | Gupta ................ G08G 1/09623 |
| 2018/0328752 | A1 | 11/2018 | Tomatsu et al. |
| 2019/0191149 | A1* | 6/2019 | Lee ..................... H04N 13/371 |
| 2021/0318538 | A1 | 10/2021 | Beckman |
| 2023/0046484 | A1 | 2/2023 | Fang et al. |

* cited by examiner

114

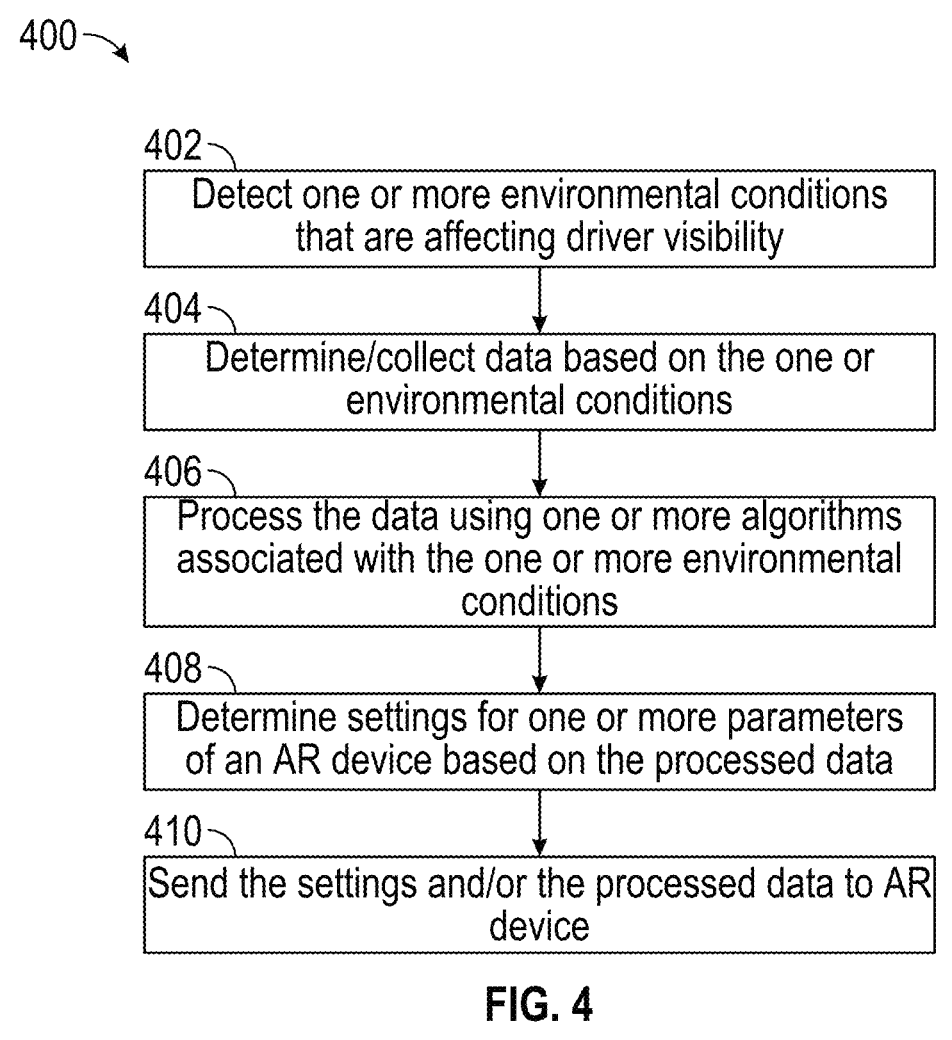

400 ⬎

402 ⬎

| Detect one or more environmental conditions that are affecting driver visibility |

404 ⬎

| Determine/collect data based on the one or environmental conditions |

406 ⬎

| Process the data using one or more algorithms associated with the one or more environmental conditions |

408 ⬎

| Determine settings for one or more parameters of an AR device based on the processed data |

410 ⬎

| Send the settings and/or the processed data to AR device |

FIG. 4

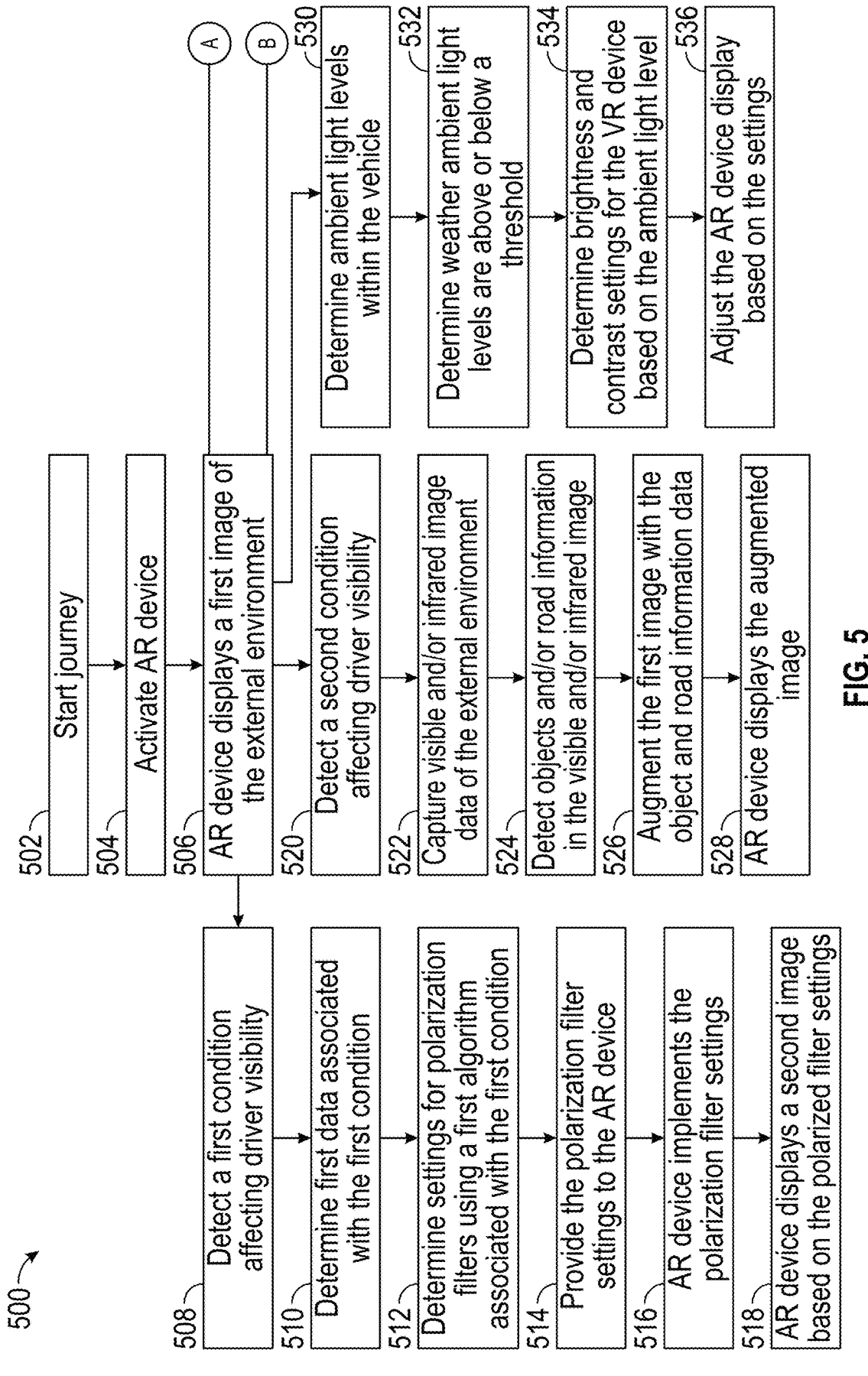

500

502 Start journey

504 Activate AR device

506 AR device displays a first image of the external environment (A)

(B)

508 Detect a first condition affecting driver visibility

510 Determine first data associated with the first condition

512 Determine settings for polarization filters using a first algorithm associated with the first condition 514 Provide the polarization filter settings to the AR device 516 AR device implements the polarization filter settings 518 AR device displays a second image based on the polarized filter settings 520 Detect a second condition affecting driver visibility 522 Capture visible and/or infrared image data of the external environment 524 Detect objects and/or road information in the visible and/or infrared image 526 Augment the first image with the object and road information data 528 AR device displays the augmented image 530 Determine ambient light levels within the vehicle 532 Determine weather ambient light levels are above or below a threshold 534 Determine brightness and contrast settings for the VR device based on the ambient light level 536 Adjust the AR device display based on the settings

FIG. 5

SYSTEMS AND METHODS FOR ENHANCING VISIBILITY WHILE DRIVING A VEHICLE

FIELD

The present disclosure relates to the field of visibility while driving a vehicle. Specifically, embodiments of the present disclosure relate to systems and methods related to enhancing the visibility while driving a vehicle in adverse weather conditions.

BACKGROUND

Reduced visibility in adverse weather conditions can make driving difficult under those conditions. Fog is a major culprit, as it creates a thick, opaque layer that significantly diminishes the distance a driver can see ahead. Rain is another common issue, as heavy downpours can obscure the road and other vehicles, and water on the windshield can distort vision, even with wipers at full speed. Additionally, rain can cause glare from oncoming headlights or streetlights, further complicating visibility. Snow and ice present unique challenges. Snowfall can create a whiteout effect, where the landscape becomes a uniform white, making it difficult to distinguish the road from its surroundings. Ice on the windshield can also obstruct vision, and snow accumulation on the road can hide lane markings and other critical road features. In some instances, wind can blow debris, dust, or snow across the road, creating sudden visibility issues. In other instances, the windscreen and windows of the vehicle may fog from the inside, which can be caused by the temperature difference between the inside and outside of the car in the presence of high humidity. This can be mitigated by using the defrost function, but it still poses a temporary visibility challenge. Low light conditions, such as during dawn, dusk, or heavy cloud cover, can also reduce visibility, making it harder to see obstacles or other vehicles. Lastly, glare from the sun, especially when it is low on the horizon, can be blinding. This is often exacerbated by wet roads, which may reflect sunlight directly into the driver's eyes. Each of these factors can significantly impair a driver's ability to see clearly, necessitating extra caution and slower driving speeds.

Traditional methods of clearing a vehicle windscreen, like windshield wipers and defrosters struggle with heavy downpours, snow, or ice. In intense rain, wipers may not clear the water fast enough, leading to reduced visibility. Snow and ice can accumulate faster than wipers can handle. Defrosters can be slow to act, especially in extremely cold conditions. The temperature difference between the inside and outside of the vehicle can cause persistent fogging in the presence of high humidity, which defrosters might not clear quickly enough. Enhanced solutions are needed for severe weather.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 illustrates a high-level flow chart of a process for enhancing driver visibility according to an embodiment of the present disclosure.

DETAILED DESCRIPTION

Overview

Figure 1:
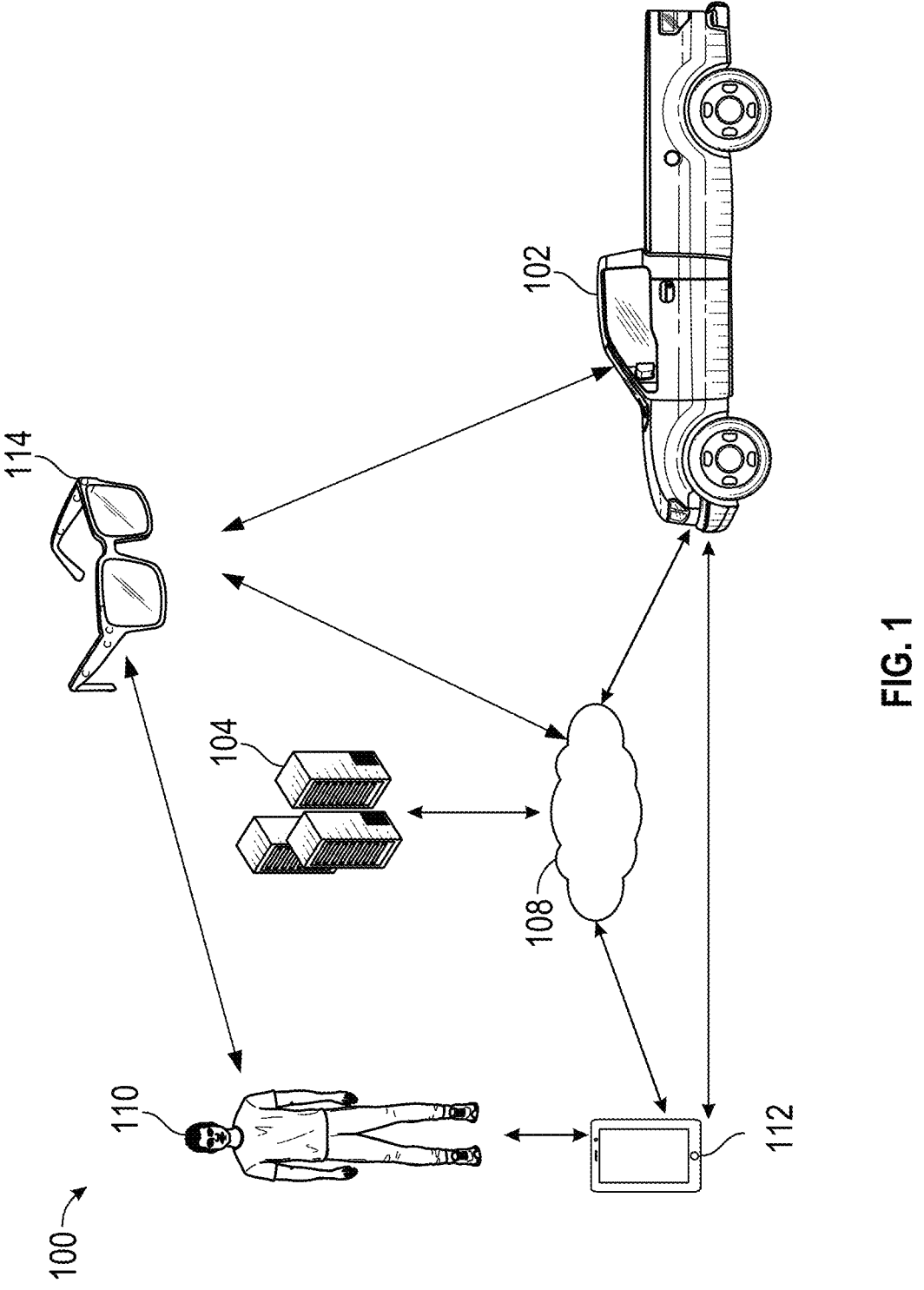
FIG. 1 illustrates an environment in which embodiments of the present disclosure can be implemented.

The present disclosure describes systems and methods for enhancing driver visibility in adverse weather conditions.

Embodiments of the present disclosure provide a method for enhancing driver visibility. The method includes displaying a first image of an environment around a vehicle. The method further includes the vehicle determining a first environmental condition associated with the environment around the vehicle and determining that the first environmental condition is causing reduced driver visibility for a driver of the vehicle. Thereafter, the method further includes the vehicle determining a type of the environmental condition and capturing, based on the type of the environmental condition, first data from one or more sensors of the vehicle. The vehicle then augments the first image using the first data to generate a second image and displays the second image.

In another instance, an augmented reality device is provided that includes one or more processors and one or more sensors that are coupled to the one or more processors. The augmented reality device further includes a memory device that is coupled to the one or more processors, and the memory device stores instructions that, when executed by the one or more processors, cause the augmented reality device to display a first image of an environment surrounding a vehicle, detect an environmental condition causing reduced driver visibility, determine a type of the environmental condition, capture, based on the type of the environmental condition, first data associated with the environmental condition, process the first data using a first algorithm to generate processed data and augment the first image using the processed data. Thus, embodiments of the present disclosure provide methods and systems for context-aware augmentation of visual data associated with an external environment of a vehicle to enable enhanced visibility while driving the vehicle.

In yet another instance, a vehicle is provided that includes one or more processors and one or more sensors coupled to the one or more processors. The vehicle further includes a memory device coupled to the one or more processors that store instructions which, when executed by the one or more processors, cause the vehicle to couple with an augmented reality device worn by a driver of the vehicle, send first image data to the augmented reality device, the first image data including information about an environment around the vehicle, determine a current environmental condition associated with the environment, determine that the current environmental condition is causing reduced driver visibility, determine a type of the environmental condition, determine, based on the type of the environmental condition, first data. The vehicle then processes the first data to determine one or more settings for the augmented reality device and communicates the one or more settings to the augmented reality device, wherein the one or more settings cause the augmented reality device to modify the first image data.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 illustrates an environment 100 in which the embodiments of the present disclosure may be implemented. The vehicle 102 can be any passenger or commercial vehicle such as a car, truck, tanker, bus, or the like. The environment 100 may also include a control server 104. The control server 104 may be part of a cloud-based computing infrastructure and may be associated with and/or include a Telematics Service Delivery Network (SDN) that provides digital data services to the vehicle 102. Details of the control server 104 are provided below with reference to FIG. 6.

The environment 100 may also include a user device 112. The user device 112 may be one of a mobile phone, a tablet, a personal computer, a smart key fob, or the like. The user device 112 may be associated with a user 110 of the vehicle 102. The user 110 may be a driver of the vehicle 102 or a passenger in the vehicle 102. The user device 112 may receive information from the vehicle 102 and/or the control server 104. The user device 112 may have a specialized application installed on it that can interface with the vehicle 102 to download and display various types of vehicle-generated information and other control data. In one embodiment, the vehicle 102 may directly communicate with the user device 112 to send and receive data without the need for the network 108 and/or the server 104.

The environment 100 may further include a network 108. The network 108 illustrates an example communication infrastructure in which the connected devices discussed in various embodiments of this disclosure may communicate. The network 108 may be and/or include the Internet, a private network, public network, or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, Ultra-Wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The environment 100 may also include an augmented reality (AR) device 114. The user 110 can use the augment reality device 114 while driving to enhance his/her awareness and aid in the driving. In some embodiments, the augmented reality device 114 may provide an audio message to the user 110 describing an environmental condition and/or provide audio information about a captured image of the external environment of the vehicle 102. The augmented reality device 114 may communicate directly with the vehicle 102 without the need for any intervening networks or devices. In an embodiment, the augment reality device 114 may also communicate with the server 104 via the network 108. The augment reality device may exchange control, configuration, and/or user profile information with the vehicle 102 and/or the server 104. Details of the augmented reality device 114 are provided with reference to FIG. 3 below.

The vehicle 102 may include a plurality of units including, but not limited to, an automotive computer, a Vehicle Control Unit (VCU), and a detection unit. Details of the vehicle 102 are provided below in reference to FIG. 2.

Figure 2:
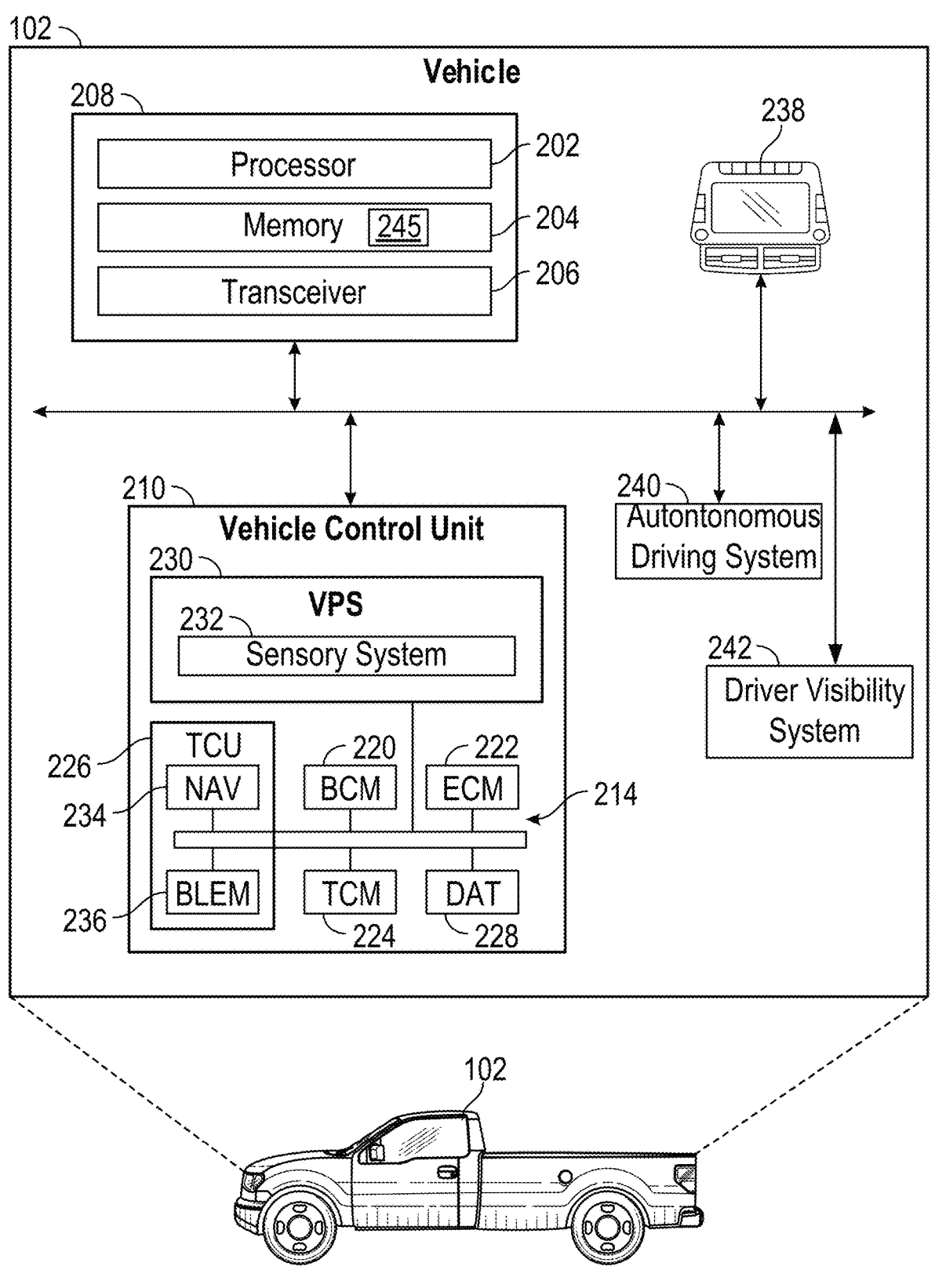
FIG. 2 illustrates a block diagram of a vehicle according to an embodiment of the present disclosure.

FIG. 2 illustrates a block diagram of the vehicle 102 in which embodiments of the present disclosure can be implemented. The vehicle 102 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, a smart fob, or the like, may be configured to connect with the automotive computer 208, which may communicate via one or more wireless connection(s), and/or may connect with the vehicle 102 directly by using near field communication (NFC) protocols, Bluetooth® protocols, Wi-Fi, Ultra-Wideband (UWB), and other possible data connection and sharing techniques.

The automotive computer 208 may be installed anywhere in the vehicle 102, in accordance with the disclosure. The automotive computer 208 may be or include an electronic vehicle controller, having one or more processor(s) 202, one or more memory devices 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems, e.g., a user device 208, an external server, and/or the like. Further, the transceiver 206 may transmit notifications, requests, signals, etc., to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power and/or communications bus with the automotive computer 208 and may be configured and/or programmed to coordinate the data between vehicle systems, connected servers, and/or the like. The VCU 210 may include or communicate with any combination of the ECUs 214, such as, for example, the BCM 220, an Engine Control Module (ECM) 222, a Transmission Control Module (TCM) 224, a Telematics Control Unit (TCU) 226, a Driver Assistance Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 102 at one or more locations and in one or more manner. For example, the various sensors of the vehicle sensory system 232 may be integrated into the various subsystems of the vehicle 102, such as doors, mirrors, roof, etc., or attached to the vehicle 102 using an appropriate mounting mechanism. In some embodiments, the various sensors of the vehicle sensory system 232 may be located at the front, back, sides, top, bottom, and underneath the vehicle 102. The location of a sensor may depend on its function. For example, a sensor that monitors the area underneath the vehicle may be connected to a bottom surface of the vehicle 102 while a sensor that can monitor an area to any side of the vehicle 102 may be mounted or integrated into the doors of the vehicle 102. Vehicle sensory system 232 may also include one or more road noise sensors such as accelerometers that are coupled to various mechanical components and/or systems of the vehicle 102. One skilled in the art will realize that the sensors may be coupled to the vehicles in various different ways and locations other than the ones mentioned above.

In some embodiments, the VCU 210 may control vehicle operational aspects and implement one or more instruction sets received from the server 104, the user device 112, or from one or more instruction sets stored in the memory 204.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), an external server, a user device, etc.), computers, and modules. The TCU 226 may be in communication with the ECUs 214 by way of a wired or wireless bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 and/or the autonomous driving system 240 may provide Level-1 through Level-5 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion and/or output or display notifications, navigation maps, etc. on the touchscreen interface portion. In some embodiments, the user device 112 may provide the HMI interface.

In an embodiment, the vehicle 102 may further include a driver visibility system 242. The driver visibility system 242 may include algorithms that process specific types of data received from the sensory system 232 and output one or more settings information that may be transmitted to the augmented reality device 114. The augmented reality device 114 may then use the settings information to modify its behavior/configuration. In an embodiment, the sensory system 232 may continually monitor multiple parameters associated with an external environment of the vehicle and provide that raw data to the driver visibility system 242. The driver visibility system 242 may then select specific data from the raw data and process that data using one or more of the algorithms to generate the setting information. For example, the sensory system 232 may monitor one or more environmental parameters like the presence and amount of rain, glare, fog, smog, snow, etc., that can affect driver visibility and generate raw data associated with these parameters. The raw data may then be provided to the driver visibility system 242. Based on the received data, the driver visibility system 242 may determine which data from the raw sensor data is to be used for mitigating the environmental parameters responsible for the reduced driver visibility. The driver visibility system may then generate settings data for the augmented reality device 114. For instance, if the environmental parameter is related to glare caused by sunlight falling on the road, the driver visibility system 242 may generate settings data for manipulating the polarization of the lens of the augmented reality device 114. The setting data may be sent to the augmented reality device 114 and the augmented reality device may modify its polarization to provide a clear image for the user that is devoid of the glare. Although the augmented reality device 114 is illustrated as a wearable device, it is to be noted that the augmented reality device 114 may be implemented in other ways such as a heads-up display of the vehicle 102 and/or in a vehicle windshield.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In addition to the components noted above, the vehicle 102 may have numerous mechanical systems and subsystems. A chassis or frame may form the backbone of the vehicle 102 and support the body and other components of the vehicle 102. The vehicle 102 may include an engine that converts fuel into mechanical power, propelling the vehicle forward. The engine includes various components such as the engine block, pistons, valves, and spark plugs. The vehicle 102 may also include a transmission system. The transmission system transfers the engine's power to the wheels. It includes the clutch, gearbox, driveshaft, and differentials, among other components. The transmission adjusts the power output to suit the vehicle's speed and load. The vehicle 102 may also include a suspension system. The suspension system absorbs shocks and maintains contact between the tires and the road, providing a smooth ride. It includes components such as springs, shock absorbers, and linkages. The vehicle 102 also includes a vehicle stopping system that allows the driver to slow down or stop the vehicle 102. It includes components like pedals, master cylinders, lines, and pads or shoes. The vehicle 102 also includes a steering system that enables the driver to guide the car. The steering system includes components such as the steering wheel, steering column, rack and pinion, and tie rods. The vehicle 102 may also include an exhaust system that removes and filters the waste gases produced by the engine. It includes the exhaust manifold, catalytic converter, muffler, and tailpipe, among other components. The vehicle 102 also includes a cooling system that prevents the engine and/or battery from overheating. It includes components such as the radiator, water pump, thermostat, and coolant. The vehicle 102 also includes a cooling system that stores and supplies fuel to the engine. It includes the fuel tank, fuel pump, fuel filter, and fuel injectors. An electrical system of the vehicle 102 powers the car's electrical components. It may include the battery, alternator, starter motor, and wiring. The Heating, Ventilation, and Air Conditioning (HVAC) system controls the temperature inside the vehicle 102. It includes the heater core, blower motor, and air conditioning compressor. In some embodiments, the vehicle may be an electric vehicle (EV) or hybrid vehicle, and in either case, some of the aforementioned components would be replaced by an electric motor and a high-voltage battery. All of the mechanical components working together ensure that the vehicle 102 operates optimally.

Figure 3:
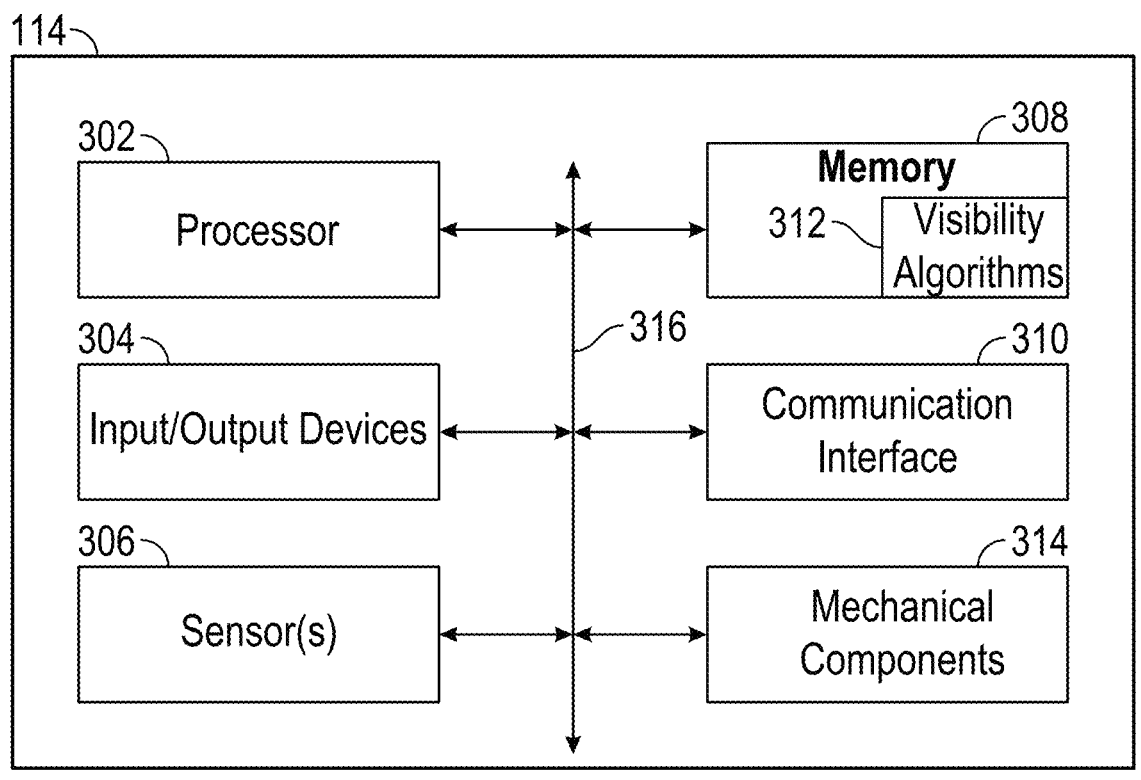
FIG. 3 illustrates a block diagram of an augmented reality device according to an embodiment of the present disclosure.

FIG. 3 illustrates a function block diagram of the augmented reality device 114 according to an embodiment of the present disclosure. The augmented reality device 114 may include one or more hardware processors 302. The processor(s) 302 may be single-core or multi-core devices (e.g., a central processing unit (CPU), a graphics processing unit (GPU), a hardware processor core, or any combination thereof). The processors 302 manage the data from sensors, execute AR applications, and render the augmented visuals seamlessly onto the display of the augmented reality device 114. The augmented reality device 114 may also include a plurality of input/output devices 304. The input/output device 304 may include a display that presents the augmented content to the user. The display can be implemented using optical see-through displays (e.g., transparent displays, such as those used in smart glasses, that allow users to see the real world directly while overlaying digital information), video see-through displays (e.g., these use cameras to capture the real world and then display it on a screen with augmented elements overlaid), or head-mounted Displays (HMDs) (e.g., these are worn on the head and can include both optical and video see-through technologies. HMDs provide an immersive augmented reality experience by covering the user's field of view with augmented content). In some embodiments, the augmented input/output devices 303 may also include touchscreens, voice-controlled systems, gesture recognition systems, handheld controllers, and the like.

The augmented reality device 114 may also include one or more sensors 306. The sensors 306 may include one or more cameras, gyroscopes, accelerometers, magnetometers, depth sensors, ambient light sensors, etc. The augmented reality device 114 may further include one or more memory devices 308. The memory device 308 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, the memory device 308 may include a module 312 that can implement the various embodiments of the present disclosure. Module 312 may include instructions and algorithms that can be executed by the processor 302 to realize the various embodiments of the present disclosure. The memory device 308 may further include the operating system, development platforms, applications, etc., associated with the augmented reality device 114.

The augmented reality device 114 may further include a communication interface 310. The communication interface 310 may use any of the known communication protocols such as Wi-Fi, Bluetooth®, or cellular networks to communicate with the vehicle 102, the server 104, the user device 110, and/or the network 108. The augmented reality device also include a plurality of mechanical components 314 such as a housing and frame that forms the outer shell or frame of the augmented reality device 114 and holds all the internal components together, one more lenses that are used for focusing and projecting the augmented content onto the user's field of view, mounting mechanisms such as adjustable straps, headbands, or ear hooks that secure the augmented realty device 114 to the user's head and maintain the correct positioning of the display relative to the user's eyes, adjustable components such as interpupillary distance (IPD) adjusters, which allow users to set the distance between lenses to match their eye spacing to ensure a comfortable and clear viewing experience, cooling systems such as small fans or heat sinks to dissipate heat and maintain optimal operating temperatures, button and controls such as physical buttons, dials, or touch-sensitive areas on the device allow users to interact with the augmented realty device 114, connector and ports such as USB ports, audio jacks, and charging connectors, and hinges and joints that allow for folding and adjusting the arms. All the components of the augmented reality device may communicate over a communication bus 316.

As noted above, a driver's visibility may be affected due to adverse weather conditions. In such instances, having a clear view of the road and surrounding environment will greatly enhance the driving experience. FIG. 4 illustrates a high-level flow chart of a process 400 for enhancing visibility according to an embodiment of the present disclosure. Consider that a driver is operating a vehicle, and it is clear and sunny outside. At a certain point, consider that the external weather changes, and it starts to rain heavily. This reduces the visibility for the driver of the road ahead and, generally, the external environment around the vehicle. The driver may then use the augmented reality device 114 to enhance his/her visibility of the road and the surroundings. When the driver wears the augmented reality device, the augmented reality device is communicably coupled to the vehicle. The augmented reality device may then use data received from its own sensors and/or data received from the vehicle sensors to generate an image of the surrounding environment of the vehicle and display that image on a display of the augmented reality device. Thus, the driver is now able to see a real-time image of the road ahead and other portions of the external environment surrounding the vehicle. At step 402, the vehicle and/or the augmented reality device may detect the environmental condition that is affecting the driver's visibility (e.g., heavy rain obscuring road markings and other objects in the environment). Based on the type of weather condition and nature of the adverse weather condition (e.g., heavy rain in the present example), the vehicle and/or the augmented reality device may activate and/or gather data from a specific set of sensors (e.g., multi-spectral sensors such as RGB cameras, Infrared sensors, and radar sensors), at step 404. The vehicle and/or the augmented reality device may then process the data using one or more specific sets of algorithms to generate processed data that includes information about the locations and types of the road markings and objects in the environment, at step 406. At step 408, the vehicle and/or the augmented reality device may determine one or more settings data for one or more parameters of the augmented reality device. At step 410, the vehicle may send the settings data and/or the process data from the sensors to the augmented reality device. The augmented reality device may then use the setting information to change the configuration of the one or more parameters. If the processed data is sent to the augmented reality device, the augmented reality device may then overlay the image of the surrounding environment with the visual markers for the road markings and the obstacles. Thus, the image provided by the augmented reality device now will present a more comprehensive and clear view of the environment surrounding the vehicle and thus mitigate the visibility issues caused by the heavy rain. This enhances the driver's driving experience.

Figure 5:
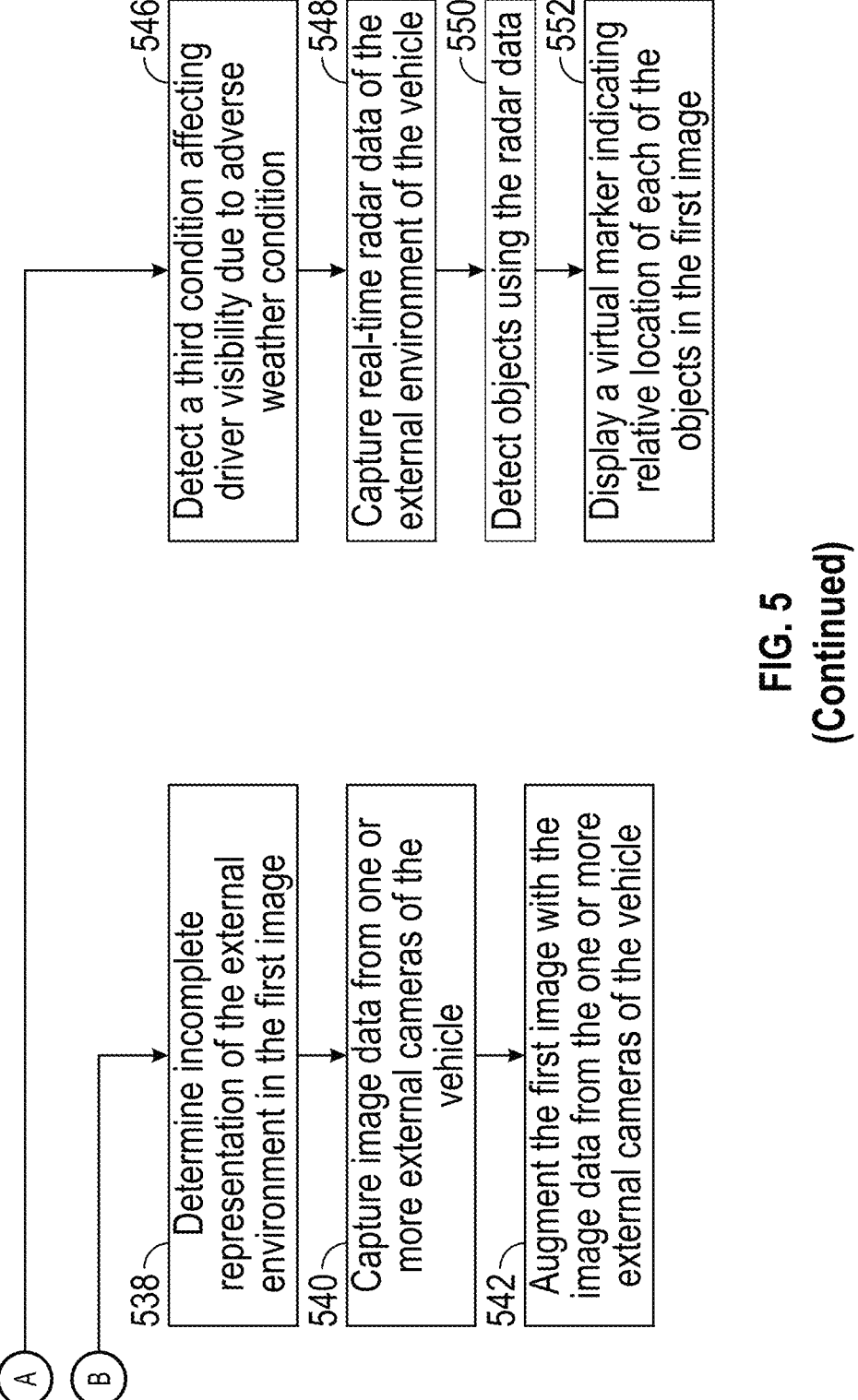
FIG. 5 illustrates some exemplary use cases for enhancing driver visibility according to another embodiment of the present disclosure.

There are several ways in which an augmented reality device can enhance the driver's visibility according to the embodiments of the present invention. In one instance, the augmented reality device can modify some of the parameters of its components based on the received data to update/modify the image it displays. In other embodiments, the augmented reality device may add information to the image it displays based on received data to provide a more comprehensive image to the driver. The method or process used by the augmented reality device to enhance the visibility of the driver may depend on the nature and the type of weather condition that is causing the reduced visibility. Depending on the type of weather or environmental condition, the vehicle and/or the augmented reality device may choose a specific process and/or a combination of processes to mitigate the effects of the environmental condition on driver visibility. FIG. 5 illustrates several examples of various environmental conditions, and the processes performed by the vehicle and/or the augmented reality device to mitigate the effects of the environmental conditions and enhance driver visibility.

A driver may start driving the vehicle (step 502) and wear the augmented reality device to aid in the driving. The augmented reality device may be activated at step 504. In some embodiments, the driver may configure one or more parameters of the augmented reality device such as brightness, contrast, augmentation types, etc. based on the driver's personal preferences and/or driving style. As part of the activation process, the augmented reality device may be communicably coupled with the vehicle. Once coupled with the vehicle, the augmented reality device and the vehicle may exchange some settings and capabilities data with each other. This informs the vehicle and the augmented reality device as to what features are supported by each of them. In some embodiments, the augmented reality device and/or the vehicle may also exchange user profile data. For instance, the augmented reality device may be personalized to a first user's preferences. If that first user is now driving another vehicle (e.g., a rental vehicle), the augmented reality device can communicate the user profile and preferences data to the other vehicle. The other vehicle may then send its capability data to the augmented reality device (e.g., information about its sensors and features it can support). Once the augmented reality device and the vehicle are "synched," the augmented reality device may then use data captured by its own sensors and/or the sensors of the vehicle to generate and display a first image of the environment around the vehicle, at step 506. For example, the first image may be captured using one or more front-facing cameras of the vehicle (e.g., a dash-cam or the like). The first image may include representation of the road as well as other objects in the environment, which may be hidden from the view of the driver if he/she was not wearing the augmented reality device (e.g., blind spots).

As noted above, the process used by the augmented reality device and/or the vehicle for mitigating the effects of the weather condition and enhancing driver visibility depends on the nature of the weather condition/phenomenon. In a first example, consider that the weather condition is such that glare from the sun reflecting off the horizontal surfaces like the road is impeding driver visibility. In this instance, the vehicle and/or the augmented reality device may determine that the glare from the sun is causing reduced visibility for the driver (step 508). For example, photometric sensors, cameras, or LIDAR systems of the vehicle and/or the augmented reality device can detect presence of glare and the direction of the glare. Photometric sensors measure the intensity of light, and by comparing the intensity of light from different directions, they can identify areas with excessive brightness, indicating glare. Cameras can capture images of the environment, and image processing algorithms can analyze these images to detect glare. These algorithms often look for high-intensity regions and specific patterns associated with glare. LIDAR systems can detect glare by measuring the reflection of laser beams. At step 510, the vehicle and/or the augmented reality device may determine first data associated with the environmental condition. The first data may include information about the intensity and direction of the glare. Based on the first data, the vehicle and/or the augmented reality device may determine settings information for the polarization filters of the augmented reality device at step 512. For example, the polarization filters of the augmented reality device may be adjusted using the 90-degree rule. The settings information may be sent to the augmented reality device (step 514). The augmented reality device may then implement the new polarization settings at step 516 and display a modified image to the user at step 518. The modified image now will display the surrounding environment without the effects of the glare thus providing enhanced visibility for the driver. It is to be noted that the augmented reality device and/or the vehicle are continually monitoring the glare in real-time and adjusting the polarization of the lenses of the augmented reality device as needed. Thus, the augmented reality device performs dynamic polarization adjustments as the vehicle is being driven so that the driver is always presented with an image without the glare.

In a second example, consider that the weather conditions involve heavy rain that obscures visibility of the driver, and the driver is unable to clearly see the road markings or other objects within the environment. The vehicle and/or the augmented reality device may detect presence of heavy rain at step 520. For example, an optical sensor mounted on the windshield of the vehicle can be used to detect the presence and amount of rain. In order to mitigate the reduced visibility due to heavy rain, the augmented reality device and/or the vehicle may capture multi-spectral data from one or more sensors, at step 522. For example, the multi-spectral data may include data in the visible spectrum and the non-visible spectrum (e.g., infrared, radar, etc.). The vehicle and/or the augmented reality device may process this multi-spectral data (step 524) and determine the location of the road markings and other objects in the environment. At step 526, the augmented reality device may augment the first image with the data about the road markings and other objects determined from the multi-spectral data. The augmented image is then displayed to the driver at step 528. Thus, the driver now has a much clearer view of the road and the surroundings. In this instance, too, the vehicle and/or the augmented reality device are continually monitoring the presence and intensity of the rain and the external environment and updating the locations of the road markings and objects in the environment in real-time as the driver is operating the vehicle.

In a third example, consider that the environmental condition is related to ambient light levels within the vehicle. The augmented reality device may continually monitor the ambient light level in the vehicle (e.g., using an ambient light sensor) at step 530. At step 532, the augmented reality device determined whether the ambient light levels are above or below a threshold. The threshold may be set by the driver according to his/her preference. Based on whether the current ambient light level within the vehicle is above or below the threshold, the augmented reality device may determine the brightness and contrast settings at step 534. The augmented reality device may then adjust the brightness and contrast settings accordingly at step 536. The augmented reality device continually monitors the ambient light levels within the vehicle and adjusts the brightness and contrast settings to provide an optimal viewing experience for the driver.

In a fourth example, consider that the environmental condition is presence of fog that reduces the visibility of the driver. In this instance, the vehicle and/or the augmented reality device may determine presence of fog and determine that the currently displayed image by the augmented device presents an incomplete representation of the environment at step 538. In this instance, the vehicle and/or the augmented reality device may capture data from the infrared sensors that can penetrate the fog and use the infrared data to enhance the image presented to the user. In addition, the vehicle may also capture data from one or more external cameras of the vehicle to capture additional images at step 540. The augmented reality device may then augment the first image with these additional images to present a more comprehensive view of the environment to the driver at step 542. This process may be done continually, and the augmented image is shown in real-time to the driver.

In a fifth example, consider that the driver is driving during nighttime and one or more of the other weather conditions are also present (e.g., heavy fog/rain during the night). In this instance, the driver visibility may be further reduced due to the low or no-light conditions at night. The augmented reality device may continually monitor the ambient light conditions within the vehicle and/or external to the vehicle and adjust the brightness and contrast settings of the augmented reality device. For example, the presence or absence of streetlights on the road may vary the ambient light conditions within the vehicle. The augmented reality device may account for this by adjusting the brightness and contrast settings in real-time as the vehicle is travelling along the road. At step 546, the vehicle and/or the augmented reality device may detect that it is raining/fog is present, and it is nighttime. The vehicle and/or the augmented reality device may conclude that the rain/fog, coupled with the low-light conditions during the night, are contributing to the reduced visibility for the driver. At step 548, the vehicle and/or the augmented reality device may capture data of the external environment of the vehicle from one or more radar sensors since, under the given weather conditions, the radar may be best suited to capture the external environment data. At step 550, the vehicle and/or the augmented reality device may detect presence and location of objects in the captured radar data. Thereafter, at step 552, the augmented reality device may modify the first image to include visual representations of the objects. The driver is now able to more clearly and accurately identify the various objects in the external environment, thus enhancing his visibility and driving experience. In some instances, the augmented reality device may also need to continually adjust the polarization settings of its lenses to account the glare from headlights of oncoming vehicles, streetlights, or other bright lights in the environment.

It is to be noted the various environmental conditions described above are exemplary and other environmental conditions other than the ones described above may also occur. In those instances too, the vehicle and/or the augmented reality device may determine the nature, type, and/or severity of the environmental condition and determine which sensor data is to be used to mitigate the effects of the environmental condition and enhance driver visibility and how the sensor data is to be processed including which specific processing algorithm is to be used. In other embodiments, a heads-up display of the vehicle may be used to display the various images instead of or in addition to the augmented reality device.

Figure 6:
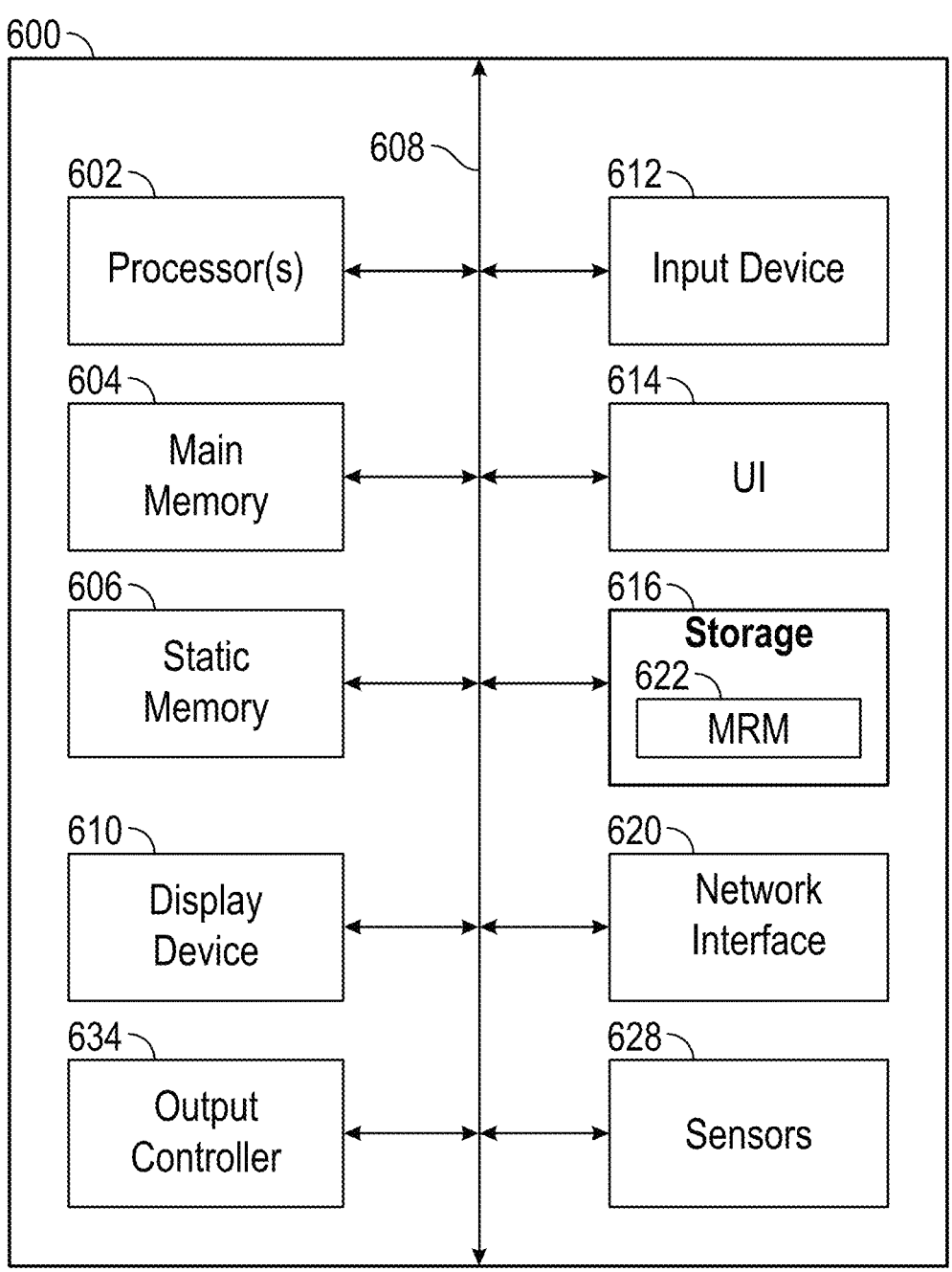
FIG. 6 illustrates a block diagram of a server according to an embodiment of the present disclosure.

FIG. 6 depicts a block diagram of an example control server 600 (e.g., control server 104 of FIG. 1) upon which any of one or more techniques (e.g., methods) may be performed or which may perform the methods described above in conjunction with the vehicle 102, in accordance with one or more example embodiments of the present disclosure. In other embodiments, the server 600 may operate as a standalone device or may be connected (e.g., networked) to other servers. In a networked deployment, the server 600 may operate in the capacity of a server machine, a client machine, or both in server-client network environments. In an example, the server 600 may act as a peer server in peer-to-peer (P2P) (or other distributed) network environments. The server 600 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The server 600 may further include a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The server 600 may additionally include a storage device (i.e., drive unit) 616, a network interface device/transceiver 620 coupled to antenna(s), and one or more sensors 628, such as a global positioning system (GPS) sensor, a compass, an accelerometer, or another sensor. The server 600 may include an output controller 634, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 616 may include a machine-readable medium 622 on which is stored one or more sets of data structures or instructions (e.g., software) embodying or utilized by any one or more of the techniques or functions described herein. The instructions may also reside, completely or at least partially, within the main memory 604, within the static memory 606, or within the hardware processor 602 during execution thereof by the server 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

The term "machine-readable medium" may include any medium that is capable of storing, encoding, or carrying instructions for execution by the server 600 and that causes the server 600 to perform any one or more of the techniques of the present disclosure or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner/driver based on recommendations or notifications provided by the vehicle should comply with all the rules specific to the location and operation of the vehicle (e.g., Federal, state, country, city, etc.). The recommendations or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name but not function.

It should also be understood that the word "example," as used herein, is intended to be non-exclusionary and non-limiting in nature. More particularly, the word "example," as used herein, indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices, such as those listed above, and stored on a computer-readable medium.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

displaying a first image of an environment around a vehicle;

determining, by the vehicle, an environmental condition associated with the environment around the vehicle;

determining, by the vehicle, that the environmental condition is causing reduced driver visibility for a driver of the vehicle;

determining, by the vehicle, a type of the environmental condition;

capturing, by the vehicle and based on the type of the environmental condition, first data from one or more sensors of the vehicle;

augmenting the first image using the first data to generate a second image; and displaying the second image, wherein the environmental condition includes glare, and the first data includes information about a direction and intensity of the glare, and further comprising:

determining, based on the first data, a setting for a polarization of a lens of an augmented reality device; and dynamically adjusting the polarization of the lens based on the first data.

2. The method of claim 1, further comprising:

displaying the first image and the second image on an augmented reality device worn by the driver.

3. The method of claim 1, wherein the one or more sensors comprise:

a first sensor configured to capture second data in a visible spectrum; and a second sensor configured to capture third data in a non-visible spectrum.

4. The method of claim 1, further comprising:

selecting, based on the environmental condition, a first algorithm to process the first data;

processing the first data using the first algorithm to generate fourth data; and augmenting the first image using the fourth data.

5. The method of claim 1, wherein the first data includes radar data, the method further comprising:

determining, by the vehicle using the first data, presence of one or more objects in the environment around the vehicle; and wherein the second image includes one or more visual markers representing the one or more objects.

6. The method of claim 1, further comprising:

capturing, by the vehicle, one or more images from one or more external cameras of the vehicle; and wherein augmenting the first image further includes displaying the one or more images in addition to the first image.

7. The method of claim 1, wherein displaying the first image comprises displaying the first image on an augmented reality device worn by the driver, the method further comprising:

determining, by the augmented reality device, a level of ambient light within the vehicle; and adjusting a brightness or contrast setting of the augmented reality device based on the level of the ambient light.

8. The method of claim 1, wherein the one or more sensors include a first sensor configured to capture fifth data in a non-visible spectrum and the first data includes infrared image data, the method further comprising:

identifying, by the vehicle using the infrared image data, one or more objects in the environment; and augmenting the first image using information about the one or more objects.

9. An augmented reality device comprising:

one or more processors;

one or more sensors coupled to the one or more processors;

a memory device coupled to the one or more processors, the memory device storing instructions that, when executed by the one or more processors, cause the augmented reality device to:

display a first image of an environment surrounding a vehicle;

detect an environmental condition causing reduced driver visibility;

determine a type of the environmental condition;

capture, based on the type of the environmental condition, first data associated with the environmental condition;

process the first data using a first algorithm to generate second data; and augment the first image using the second data, wherein the environmental condition includes glare, and the first data includes information about a direction and intensity of the glare, wherein the instructions further cause the augmented reality device to:

determine, based on the first data, a setting for a polarization of a lens of the augmented reality device; and dynamically adjust the polarization of the lens based on the first data.

10. The augmented reality device of claim 9, wherein the one or more sensors include:

a first sensor configured to capture third data in a visible spectrum; and a second sensor configured to capture fourth data in a non-visible spectrum.

11. The augmented reality device of claim 10, wherein the augmented reality device is further operable to:

capture fifth data of the environment using the second sensor;

identify, using the fifth data, one or more objects in the environment; and include a visual representation of the one or more objects in the first image.

12. The augmented reality device of claim 9, wherein the instructions further cause the augmented reality device to:

determine a level of ambient light within the vehicle;

determine a setting for a brightness value or a contrast value based on the level of the ambient light; and adjust the brightness value or the contrast value based on the setting.

13. The augmented reality device of claim 9, wherein the instructions further cause the augmented reality device to:

receive, from the vehicle, one or more images of the environment, the one or more images being different than the first image; and display the one or more images in addition to the first image.

14. A vehicle comprising:

one or more processors;

one or more sensors coupled to the one or more processors;

a memory device coupled to the one or more processors and storing instructions which, when executed by the one or more processors, cause the vehicle to:

couple with an augmented reality device worn by a driver of the vehicle;

send a first image data to the augmented reality device, the first image data including information about an environment around the vehicle;

determine an environmental condition associated with the environment;

determine that the environmental condition is causing reduced driver visibility;

determine a type of the environmental condition;

determine, based on the type of the environmental condition, first data;

process the first data to determine one or more settings for the augmented reality device; and communicate the one or more settings to the augmented reality device, wherein the one or more settings cause the augmented reality device to modify the first image data, wherein the environmental condition includes glare, and the first data includes information about a direction and intensity of the glare, and wherein the one or more settings include a setting for a polarization of a lens of the augmented reality device, and the instructions further cause the vehicle to dynamically adjust the polarization of the lens based on the first data.

15. The vehicle of claim 14, wherein the first data includes data in a non-visible spectrum and wherein the one or processors are operable to execute the instructions to further cause the vehicle to:

determine, using the first data, one or more objects in a current environment;

generate a second image, the second image including the first image augmented with a visual representation of each of the one or more objects, wherein the second image is displayed by the augmented reality device.

16. The vehicle of claim 14, wherein the one or processors are operable to execute the instructions to further cause the vehicle to:

capture second data, including one or more images of a current environment that are different than the first image data; and send the second data to the augmented reality device, wherein the augmented reality device displays the one or more images in addition to the first image data.

17. The vehicle of claim 14, wherein the one or processors are operable to execute the instructions to further cause the vehicle to:

receive user profile and preference data from the augmented reality device; and send vehicle capabilities data to the augmented reality device.

18. The vehicle of claim 14, wherein the environmental condition includes glare from sunlight and wherein the one or more settings include a setting for a polarization value for the augmented reality device.

19. The vehicle of claim 14, wherein the one or more sensors include:

a first sensor configured to capture third data in a visible spectrum; and a second sensor configured to capture fourth data in a non-visible spectrum.

* * * * *